(12) United States Patent
Walston

(10) Patent No.: US 7,843,894 B2
(45) Date of Patent: Nov. 30, 2010

(54) METHOD FOR FAST REINSTALLATION OF DEPLOYED DOCSIS DEVICES

(75) Inventor: Robert A. Walston, Atlanta, GA (US)

(73) Assignee: ARRIS Group, Inc., Suwanee, GA (US)

( * ) Notice: Subject to any disclaimer, the term of this patent is extended or adjusted under 35 U.S.C. 154(b) by 730 days.

(21) Appl. No.: 11/183,304

(22) Filed: Jul. 15, 2005

(65) Prior Publication Data
US 2006/0015918 A1 Jan. 19, 2006

Related U.S. Application Data

(60) Provisional application No. 60/588,068, filed on Jul. 15, 2004.

(51) Int. Cl.
*H04J 1/00* (2006.01)
(52) U.S. Cl. .................. 370/343; 370/330; 370/332; 370/331
(58) Field of Classification Search .......... 370/331, 370/329, 330, 332, 343; 725/111, 134; 455/66.1, 455/67.11
See application file for complete search history.

(56) References Cited

U.S. PATENT DOCUMENTS

| 6,510,461 | B1 * | 1/2003 | Nielsen ................ 709/224 |
| 6,574,796 | B1 * | 6/2003 | Roeck et al. ............. 725/111 |
| 6,650,624 | B1 * | 11/2003 | Quigley et al. ............ 370/252 |
| 6,940,874 | B2 * | 9/2005 | Ruszczyk et al. .......... 370/516 |
| 7,164,885 | B2 * | 1/2007 | Jonsson et al. ............ 455/41.2 |
| 7,443,873 | B1 * | 10/2008 | Beser ..................... 370/432 |
| 2006/0120282 | A1 * | 6/2006 | Carlson et al. ............ 370/229 |
| 2006/0262722 | A1 * | 11/2006 | Chapman et al. .......... 370/229 |

FOREIGN PATENT DOCUMENTS

JP 2002176465 A * 6/2002

\* cited by examiner

*Primary Examiner*—Huy Phan
(74) *Attorney, Agent, or Firm*—Troy A. Van Aacken; Robert J. Starr

(57) ABSTRACT

After a user device unsuccessfully attempts to establish upstream communication with a central network equipment downstream frequency to which it has tuned, an identifier corresponding to the tuned-to downstream frequency is removed from a cache of the user device. The frequency identifier stored in the cache typically corresponds to a frequency to which the user device has previously successfully tuned. The frequency identifier is removed from the cache after a predetermined attempt period, which may be determined by the number of attempts to establish communication that are made after previous unsuccessful attempts.

19 Claims, 1 Drawing Sheet

METHOD FOR FAST REINSTALLATION OF DEPLOYED DOCSIS DEVICES

CROSS REFERENCE TO RELATED APPLICATION

This application claims priority under 35 U.S.C. 119(e) to U.S. provisional patent application No. 60/588,068 entitled "Method for fast reinstallation of deployed DOCSIS devices," which was filed Jul. 15, 2004, and is incorporated herein by reference in its entirety.

FIELD OF THE INVENTION

This invention relates, generally, to communication devices and, more particularly, to facilitating installation of a device previously installed at a different location.

BACKGROUND

Network interface user devices, such as, for example, cable modems, are one way that multiple services operators ("MSO") have been meeting the demand for increased bandwidth capabilities in delivering information over networks from a central location, such as a head end, to users, such as residential and commercial end-users. To facilitate such information delivery, standards have been developed that allow equipment from different manufacturers to operate, or 'talk,' with one another. The predominant standard used in the cable modem industry is known as Data Over Cable Service Interface Specification, or ("DOCSIS"), for use in delivering digital data, such as internet information, to users over the existing coaxial lines of the Community Antenna Television system ("CATV"), which has been delivering cable television programming to users at least since the 1960's.

As the DOCSIS standard evolves, more features are added that increase reliability, user-friendliness and performance. Thus, the growth of DOCSIS devices for obtaining broadband service has grown as well. Societies in which use of broadband services is growing rapidly tend to be mobile, i.e., people relocated often. People in these societies who subscribe to broadband services often own their equipment for interfacing with broadband networks, and therefore often prefer to take their broadband interface devices, such as cable modems, for example, with them when they relocate their residence of business location. Another common scenario occurs when a broadband customer who has a rented/leased user device/modem cancels service and the MSO redeploys the same device to another location when installing broadband service for another customer at another location.

When a subscriber or MSO relocates a user device, different central network equipment, such as, for example, a cable modem termination system ("CMTS"), may serve the new location than served the previous location—even if the MSO is the same. Alternatively, the same CMTS may serve two different locations using the same downstream channel frequency, but still not provide upstream connectivity over the same upstream channels that were provisioned for the old location. In summary, although downstream traffic at the downstream CMTS frequency used by the previous CMTS may be present at the second location of the user device, there may not be an upstream connection between the new location and the CMTS/blade that serves the new location.

Thus, when a user connects a device at the new location, the device may recognize the previous location's downstream frequency, based on an identifier associated therewith which may be stored in its memory cache, and tune (also referred to as lock) to said frequency. This can occur under the common scenario where a CMTS downstream channel signal can be received at different locations on the network. However, although a downstream signal may be received at multiple network locations, upstream channels provisioned and associated with a given downstream channel frequency may not always be physically connected from all locations on the network to the CMTS producing the given downstream channel.

Therefore, since there may be no upstream connection between the new location and the previous CMTS that are linked with the tuned-to frequency, the registration process does not complete because upstream communication transmission between the modem at the new location and the previous CMTS cannot be established. Since registration is not completed, the user device continues to scan for downstream frequencies that can be locked and that correspond to a CMTS that can receive the user device's upstream transmissions.

As this scanning process progresses, the user device typically periodically attempts to lock with frequencies stored in its cache memory if scanning for present downstream frequencies does not result in a lock. However, since the frequency identifier for the frequency used at the old location is still stored in the cache, the user device may repeatedly attempt to lock and establish communication with the CMTS generating the tuned-to frequency.

Therefore, time is wasted as the user device attempts to complete registration with the CMTS to which it cannot connect. Each time the user devices locks to a downstream frequency, it seeks to establish communication with the CMTS providing that downstream channel. However, if the locked-to downstream channel does not correspond to a CMTS with which the user device can communicate, then the time spent attempting to establish communication with the CMTS producing the downstream frequency to which the user device is locked it fruitless, and therefore wasted.

Thus, there is a need in the art for a method for eliminating the wasted time associated with repeatedly locking a user device to a downstream channel frequency not corresponding to a CMTS with which the user device can establish communication.

SUMMARY

It is an object to provide a method for reducing the time for registering a user device that has been moved from a previous location to a new location. When attempting to register with central network equipment, such as, for example, a CMTS, a user device, such as, for example, a cable modem, tunes/locks to a downstream frequency associated with a downstream frequency identifier that is stored in an internal memory or cache. The user device sends a message requesting access to the central network equipment that corresponds to the locked downstream frequency, and the user device determines whether a response to the access request message has been received from the central network equipment. If after attempting to send an upstream message over each of the upstream channels associated with the CMTS that is providing the tuned-to downstream channel frequency, the user device removes the downstream frequency identifier associated with the currently tuned-to downstream frequency from the cache if upstream communication cannot be established with the central network equipment that corresponds to the locked frequency.

DETAILED DESCRIPTION

Figure 1:
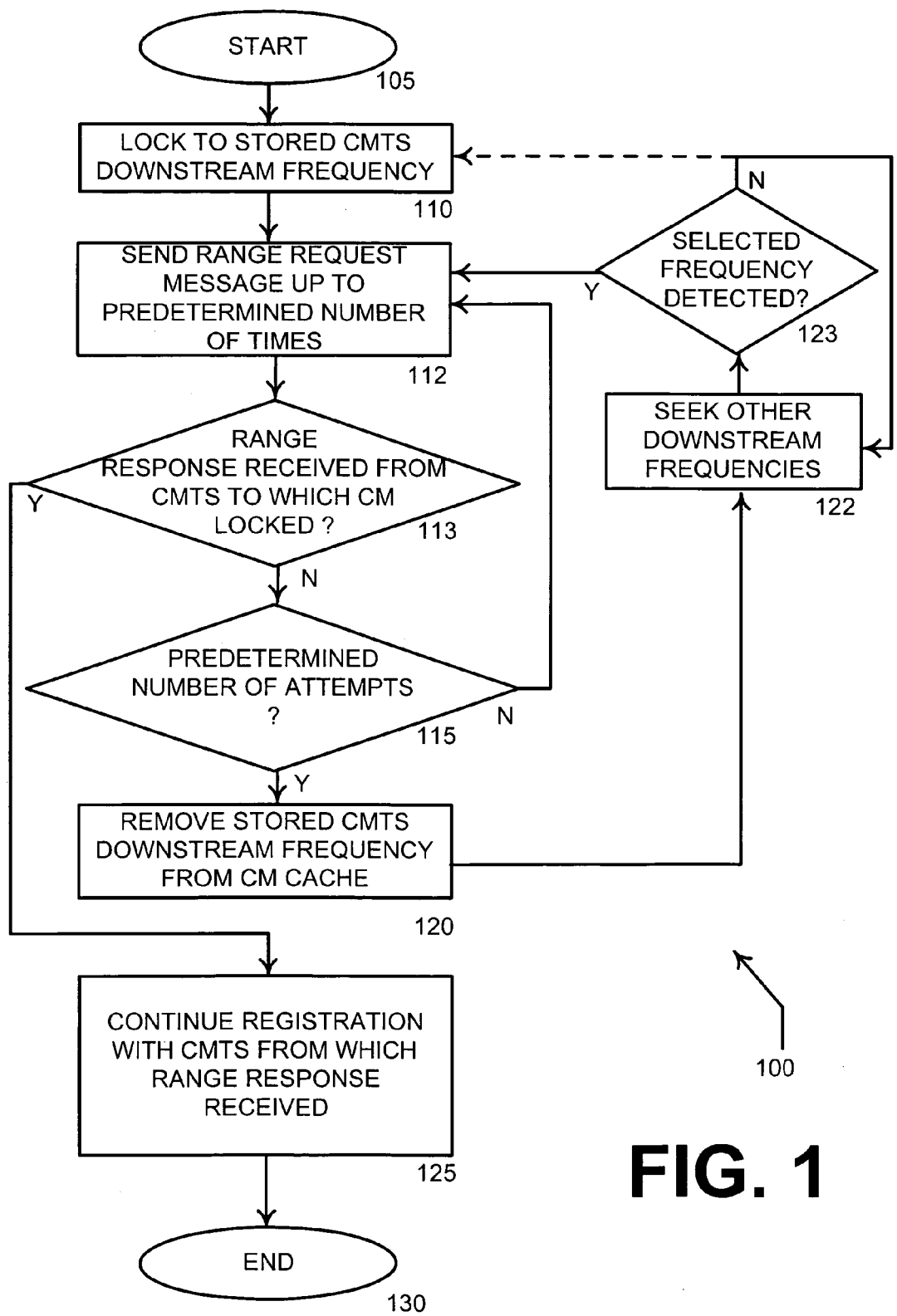
FIG. 1 shows a flow diagram of a process for reducing the time for registering a user device that has been moved from a previous location to a new location.

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof.

Turning now to the figures, FIG. 1 illustrates flow diagram of a method 100 for reducing the time for registering a user device that has been moved from a previous location to a new location. Method 100 starts at step 105 when a user starts the boot process for a user device, such as, for example, a cable modem that has been moved from a first ("old") location to a second ("new") location. The device seeks a downstream channel frequency that it can lock to, and may attempt to lock to a frequency that has an associated frequency identifier stored in its memory cache. Storing a frequency identifier in a memory cache facilitates relocking to a previously locked frequency following a loss of lock, such as may result from a loss of power to the device, intentional removal from service for maintenance/repair, or other similar cause.

When the boot process is started by, for example, applying power to the user device, the device may seek a frequency that is stored in its cache rather than scan for an available frequency. This may save time in the registration process if the frequency is from the central network equipment, such as, for example, a CMTS, that serves the location of the user device. Such would typically be the case when a cable modem attempts to register following an electrical power outage.

If power is removed from the modem and it is transported to another location, signals at the first frequency may be present at the new location, but the upstream channels may be physically connected differently, or not at all. Thus, even though the modem in the new location can tune and lock to a frequency that is present at its communication port, it may not be able to communicate in the upstream direction over an upstream channel that corresponds to the CMTS downstream channel to which it is tuned.

Although attempting to tune to a stored frequency may save time when the CMTS to which it corresponds is available, time is wasted in attempting to obtain a response from the CMTS when there is no physical upstream connection between the modem and the CMTS, the downstream frequency of which the modem is locked. Thus, a modem locks to a CMTS downstream frequency at step 110. A network access request message, such as, for example, a range request message in a DOCSIS network environment, is transmitted to the CMTS generating this frequency at step 112. Transmitting this message may be repeated up to a predetermined number of times. At step 113, the modem determines whether a response to an access request is received from the CMTS to which it is locked. If it is determined at step 113 that an access request response is received at the modem from the CMTS to which it is locked in the downstream direction, the modem continues with the registration process at step 125 as known in the art and process 100 ends at step 130.

If, however, no network access request response is received as determined at step 113, a determination is made a step 115 whether the predetermined number of attempts has been made. If not, then process 100 returns to step 112 and continues.

If at step 115 it is determined that the predetermined number of request messages has been transmitted, the frequency identifier that corresponds to the currently tuned frequency is removed from the cache at step 120 and other downstream frequencies are sought by the user device at step 122. In seeking other downstream frequencies with which to lock at step 122, the user device attempts to detect other frequencies that are part of the downstream operating spectrum. For example, in a DOCSIS environment, downstream channels are typically evenly centered at 6 MHz intervals above 87 MHz to about 860 MHz, depending on the integrity of the broadband network. In a EuroDOCSIS environment, downstream channels are typically centered on 8 MHz intervals.

This scanning at step 122 may begin at the highest frequency in the spectrum and progress through the range of possible downstream frequencies. It will be appreciated that the user device may also scan the range of possible frequencies from lowest to highest frequency, as opposed to highest to lowest. After scanning and selecting a frequency from the frequency spectrum at step 122, process 100 continues at step 123 where a determination is made whether the frequency selected at step 122 is detected (i.e., present) on the network. If not, process 100 returns to step 122 where the next frequency in the spectrum is selected. If at step 123 a determination is made that the selected frequency is present on the network, process 100 tunes to the selected frequency and returns to 112.

It will be appreciated that a user device may periodically attempt to lock to a frequency corresponding to a frequency identifier stored in the cache, thus overriding the scanning steps 122 and 123. This is indicated in the FIGURE by the broken line between steps 123 and 110. However, having removed stored frequency identifiers at step 120 as discussed above, a user device will not attempt to lock to a frequency that has already been determined by process 100 as being invalid. Thus, the scenario of trying to tune to a frequency that does not correspond to the central equipment that serves the particular user device before all the frequencies in the spectrum have been scanned at steps 122 and 123 is avoided.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method for reducing the time for registering a user device with central network equipment, the user device having been moved from an old location to a new location, comprising:

locking to a downstream frequency provided by the central network equipment at the new location and associated with a frequency identifier stored in a cache of the user device;

transmitting a network access request message to the central network equipment on an upstream channel having a predetermined correspondence in the user device to the locked downstream frequency at the old location;

determining whether a response to the network access request message has been received from the central network equipment; and removing the downstream frequency identifier from the cache if the response to the network access request message has not been received from the central network equipment at the new location.

2. The method of claim 1 wherein the network access request message is a range request message sent over a Data Over Cable Service Interface Specification (DOCSIS) network.

3. The method of claim 1 wherein the central network equipment includes a Cable Modem Termination System (CMTS).

4. The method of claim 1 wherein the user device includes a cable modem.

5. The method of claim 1 wherein the user device includes an embedded media terminal adaptor.

6. The method of claim 1 wherein determining whether a response to the network access request message has been received is iterated for a predetermined number of times.

7. The method of claim 1 wherein transmitting a network request access message is performed a predetermined number of times.

8. The method of claim 1 further comprising scanning a range of predetermined frequencies of a network communication specification for a frequency to tune.

9. The method of claim 8 wherein the network communication specification is DOCSIS.

10. The method of claim 1 wherein a plurality of frequency identifiers are stored in the cache.

11. The method of claim 1 further comprising:

scanning a range of predetermined frequencies of a network communication specification for a frequency to attempt to tune as a result of removing a frequency identifier from the cache, wherein a plurality of frequency identifiers are stored in the cache; and periodically seeking a frequency corresponding to a frequency identifier stored in the cache at a time when tuning a frequency from among the predetermined range of frequencies is not being attempted.

12. A method for reducing the time for registering a user device with central network equipment, the user device having been moved from an old location to a new location, comprising:

locking to a downstream frequency provided by the central network equipment at the new location and associated with a frequency identifier stored in a cache of the user device;

transmitting a network access request message to the central network equipment on an upstream channel having a predetermined correspondence in the user device to the locked downstream frequency at the old location;

determining whether a response to the network access request messages has been received from the central network equipment;

removing the downstream frequency identifier from the cache if the response to the network access request message has not been received from the central network equipment at the new location;

scanning a range of predetermined frequencies specified by a network communication specification for a frequency to attempt to tune after a downstream frequency identifier has been removed from the cache, wherein a plurality of frequency identifiers are stored in the cache; and periodically seeking a frequency corresponding to a frequency identifier stored in the cache at a time when tuning a frequency from among the predetermined range of frequencies is not being attempted.

13. The method of claim 12 wherein the network access request message is a range request message sent over a DOCSIS network.

14. The method of claim 12 wherein the central network equipment includes a CMTS.

15. The method of claim 12 wherein the user device includes a cable modem.

16. The method of claim 12 wherein the user device includes an embedded media terminal adaptor.

17. The method of claim 12 wherein determining whether a response to the network access request message has been received is iterated a predetermined number of times.

18. The method of claim 12 wherein transmitting a network request access message is performed up to a predetermined number of times.

19. The method of claim 12 wherein the network communication specification is DOCSIS.

* * * * *